March 18, 1958 — W. W. DUFFY — 2,827,316

HUB CLAMPING MECHANISM

Filed July 21, 1953

INVENTOR.
WILLIAM W. DUFFY
BY Leech & Radue
ATTORNEYS

2,827,316

HUB CLAMPING MECHANISM

William W. Duffy, Baltimore, Md.

Application July 21, 1953, Serial No. 369,365

2 Claims. (Cl. 287—52)

The present invention relates to a hub clamping mechanism by means of which a hub-like member can be detachably secured against both rotation and sliding on a smooth, round shaft or the like.

The principal object of this invention is to provide a hub member with an arcuate shaft clamping member pivotally mounted within a bore recess of said hub member and adapted positively to grip and hold said hub member on any part of a cylindrical shaft, without the necessity for any modification of the surface of said shaft.

Stated more specifically, it is the object of this invention to provide a shaft and detachable hub combination in which detachability is attained by means of an arcuate clamping member pivotally mounted and fitted within the hub so that there is no substantial interruption of the surface engaged by the shaft, and in which the hub is provided with an external and positively acting means for holding the arcuate clamping member tightly against the received shaft while providing for ready release of the clamping member and easy removal from the shaft.

It is another specific object of this invention to provide a hub member with an arcuate clamping member recessed in the bore thereof, pivoted by one end therein for limited movement between clamping and unclamping relation to a shaft having the diameter of the bore of the hub member, with substantial arcuate engagement between the clamping member and the shaft surface, and externally operable means carried by the hub member and acting on the other end of the arcuate clamping member to maintain clamping relation.

For purposes of illustration the invention is embodied as a cylindrical hub member mounted on a shaft and having a rotary slitter knife holder detachably secured on one end of the hub member. The principles of the invention are not, however, thus limited, as the clamping means provided may be used in mechanical coupling halves, rollers, gear members, and any other mechanisms where it is desired to secure a hub or like member against rotation and sliding on a round shaft, rod, or tubular member.

The above indicated and other objects and advantages of this invention will be more fully understood by reference to the accompanying drawings and the following description of a preferred embodiment.

Figure 1:
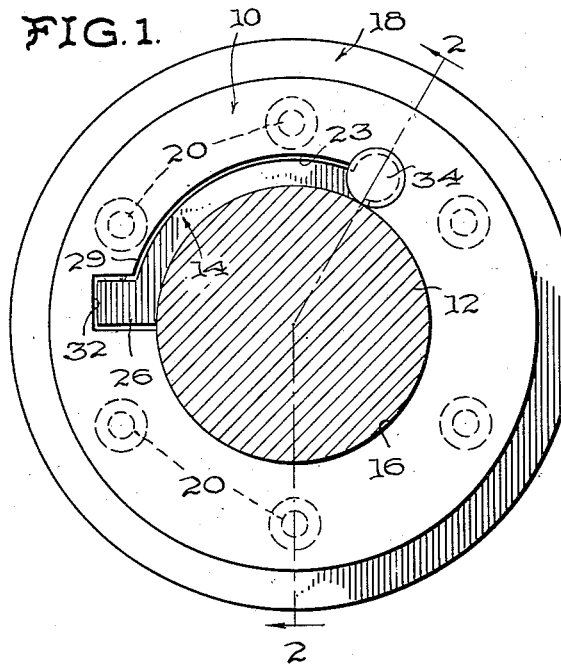
Fig. 1 is an end view of a hub and shaft assembly.
Figure 3:
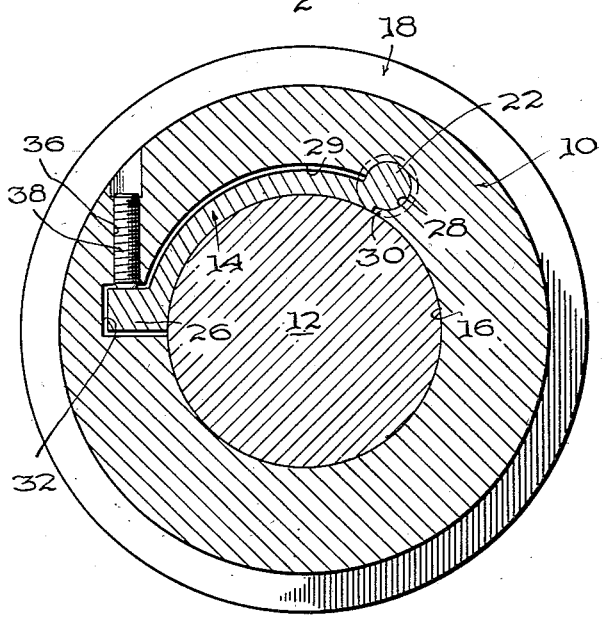
Fig. 3 is a cross-sectional view taken on the line 3—3 of Fig. 2.

The clamping mechanism of this invention is shown to comprise a cylindrical hub member 10, a round smooth shaft 12 having a sliding fit in said hub member, and a generally arcuate clamping member or element 14 received in a recessed part of the hub bore 16, as shown most clearly in the end view of Fig. 1 and the sectional view of Fig. 3. The arcuate clamping member 14, the inner surface of which has the curvature of bore 16, is pivotally connected to the inside of the hub 16 and retained therein by means to be described in detail.

Figure 2:
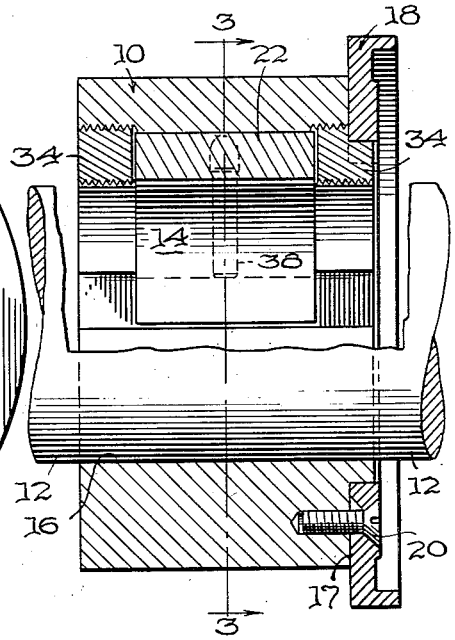
Fig. 2 is a longitudinal sectional view of Fig. 1 taken on line 2—2.

In the illustrative embodiment of the invention, a rotary slitter knife 18 of annular configuration surrounds one end of the shaft 12 in spaced relation, as shown in Fig. 2, and fits within a shouldered circumferential recess 17 formed in the adjacent end of the hub 10. The knife 18 is detachably secured to the hub member 10 by means of a plurality of machine screws 20 which extend through the central part of the cutter and into threaded engagement with the adjacent portion of the hub member 10.

Figure 4:
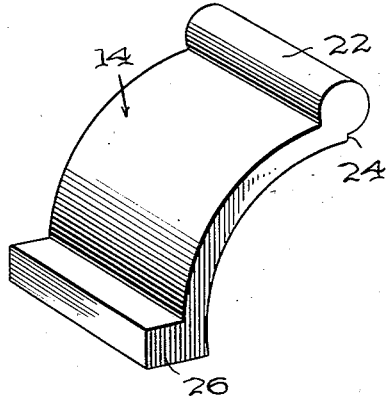
Fig. 4 is an end perspective view of the arcuate clamping member or element.

Fig. 4 shows the details of configuration of the generally arcuate clamping member 14 which is received in the portion of the hub member 10 adjacent the bore 16. It will be seen that one end of the clamping member 14 is shaped to provide an integral pivot formation 22, which is cylindrical through approximately 270 degrees, extending from an inner shoulder 24, that is in turn in radial relation to the center of the inner arcuate clamping surface. The other end of the arcuate clamping member 14 is formed with an outwardly extending stop abutment 26 having its lower side lying substantially in the plane of a radius line extended from the center of hub bore 16, and having its upper surface parallel thereto.

The arcuate clamping member 14 can most conveniently be pivotally and hingedly connected within the central part of the hub member 10 by forming the latter with a complemental channel 28 of arcuate cross section extending lengthwise of the hub member and opening to the bore 16 thereof as shown in Fig. 3. In order to receive the arcuate clamping member 14, the bore 16 of hub 10 is also formed with a longitudinal arcuate groove 29 that is undercut from the main bore surface an amount approximately equal to the thickness of the intermediate part of the clamping member 14, and is of an arcuate extent corresponding to the outer curved surface thereof. The circular pivot channel 28 terminates at one side in an inner shoulder formation 30 arranged to engage and stop the shoulder 24 of clamping member 14 in its innermost position. At the other side of the bore groove or recess 29 there is formed a slot 32 of rectangular outline, which is complemental to and loosely receives the outwardly extending stop abutment 26 of the clamping member 14.

For the purpose of retaining the arcuate clamping member 14 in the central position shown, a pair of plugs 34, 34 are inserted in flush relation at the opposite ends of the circular channel 28 and arranged to permit a very small amount of clearance sufficient only for easy pivoting of the arcuate clamping member. The end plugs 34 are threadedly engaged in the circular channel 28, but it will be understood that other securing means may be used and that, where desired, the groove 29 may be extended only partially the length of the bore 16 to provide an integral fixed abutment with securing of the arcuate clamping member 14 from the undercut end only by means of a single plug 34 or the like.

It is to be particularly observed that the clamping member 14 continuously engages the shaft 12 as a band through an arc of the order of 120 degrees. That is to say, the arc of engagement is preferably more than 90 degrees and less than 180 degrees. Furthermore the ratio of the peripheral length of the arcuate shaft engaging surface of the member 14 to the width thereof is approximately 3 to 2. The unusually large arcuate and widthwise extent of engagement has been found highly satisfactory when the clamping mechanism of the invention has been used for the operation of high speed rotary cutters.

The clamping and unclamping action of the arcuate member 14 on the shaft 12 is preferably controlled by screw means carried by the hub 10. A tapped screw bore 36 extends inwardly from the outer surface of the hub 10 to one side of the center and in direction and position perpendicularly to intersect, if extended, the adjacent side surface of the stop abutment 26 in the complemental hub slot 32. A countersunk set screw 38 threadedly engaged in the tapped bore 36 requires only a small amount of turning to set or release the clamping member 14. This arrangement of the set screw 38 avoids any outward projections on the hub 10 and provides a positively acting clamping means.

The operation of the hub clamping mechanism of this invention will be mostly apparent from the foregoing descriptions of its components. When the set screw 38 has been loosened sufficiently to permit removal of the hub 10 from the shaft 12, the arcuate clamping member 14 will move slightly into the bore area of the hub upon such removal. The extent of this movement is limited by the slot 32 so that reinsertion of the shaft 12 is facilitated.

Among the advantages offered by the novel hub clamping mechanism of this invention are a substantially complete and continuous engagement of the periphery of the retained shaft by the arcuate clamping member 14 and the circumferential bore continuation thereof, the avoidance of the use of springs in association with the clamping element, and the provision for a clamping member that is in continuous engagement with the shaft throughout its length and has a length of arc sufficient to widely distribute the clamping force and the reaction to such force in the bore of the hub.

There has also been produced by the novel combination disclosed a clamping mechanism that is simple and rugged in construction and offers economy in manufacture and maintenance.

Although only a preferred embodiment has been described in detail, it will be understood that modifications can be made in details of construction and arrangement of parts without departing from the principles of the invention and the scope of the appended claims.

Having thus described my invention, what I claim as novel and desire to secure by Letters Patent of the United States is:

1. A clamping device adapted to be secured on a round shaft; said clamping device comprising a hub having a cylindrical bore fitting the shaft; a clamping member having an arcuate shaft-engaging surface of the same curvature as the cylindrical bore and an arcuate extent of the order of 120 degrees, said clamping member having a cylindrical pivot formation on one end and an outwardly extending, rectangularly shaped stop abutment on the other end, said cylindrical bore being formed with a recess extending the length thereof and complementally receiving the arcuate part of the clamping member with the shaft-engaging surface as a continuation of said cylindrical bore, complementally and pivotally receiving the cylindrical pivot formation, and complementally but loosely receiving the stop abutment to accommodate limited movement into and out of clamping engagement; plug means fixed in the bore recess at opposite ends of the cylindrical pivot formation to secure it in the hub against longitudinal movement; and a set screw threaded into the hub from the outer surface thereof and operatively engageable with the stop abutment.

2. A clamping device adapted to be secured on a round shaft, said clamping device comprising a hub having a cylindrical bore fitting the shaft; a clamping member having an arcuate shaft-engaging surface of the same curvature as the cylindrical bore and an arcuate extent of more than 90 degrees and less than 180 degrees, said clamping member having a cylindrical pivot formation on one end and an outwardly extending stop abutment on the other end, said cylindrical bore being formed with a recess extending the length thereof and complementally receiving the arcuate part of the clamping member with the shaft-engaging surface as a continuation of said cylindrical bore, complementally and pivotally receiving the cylindrical pivot formation, and complementally but loosely receiving the stop abutment to accommodate limited movement into and out of clamping engagement; means fixed in the bore recess at opposite ends of the cylindrical pivot formation to secure it in the hub against longitudinal movement; and a set screw threaded into the hub from the outer surface thereof and operatively engageable with the stop abutment.

References Cited in the file of this patent

UNITED STATES PATENTS

| 726,942 | Keyes | May 5, 1903 |
| 1,011,422 | Fernandez | Dec. 12, 1911 |
| 2,591,281 | Musschoot | Apr. 1, 1952 |
| 2,638,365 | Jones | May 12, 1953 |

FOREIGN PATENTS

| 663,902 | Great Britain | Dec. 27, 1951 |